No. 858,636. PATENTED JULY 2, 1907.
L. C. STEELE.
MACHINE FOR MAKING EXPANDED METAL.
APPLICATION FILED AUG. 20, 1906.
3 SHEETS—SHEET 1.
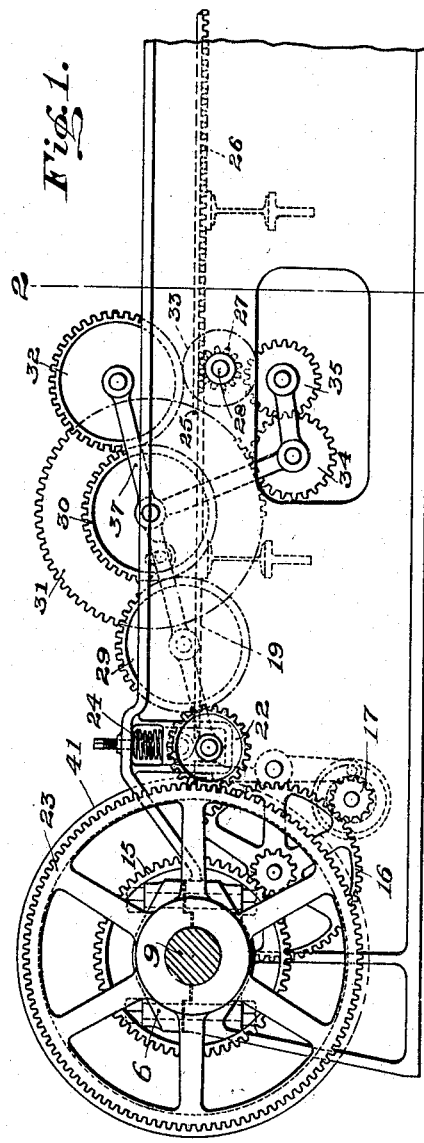
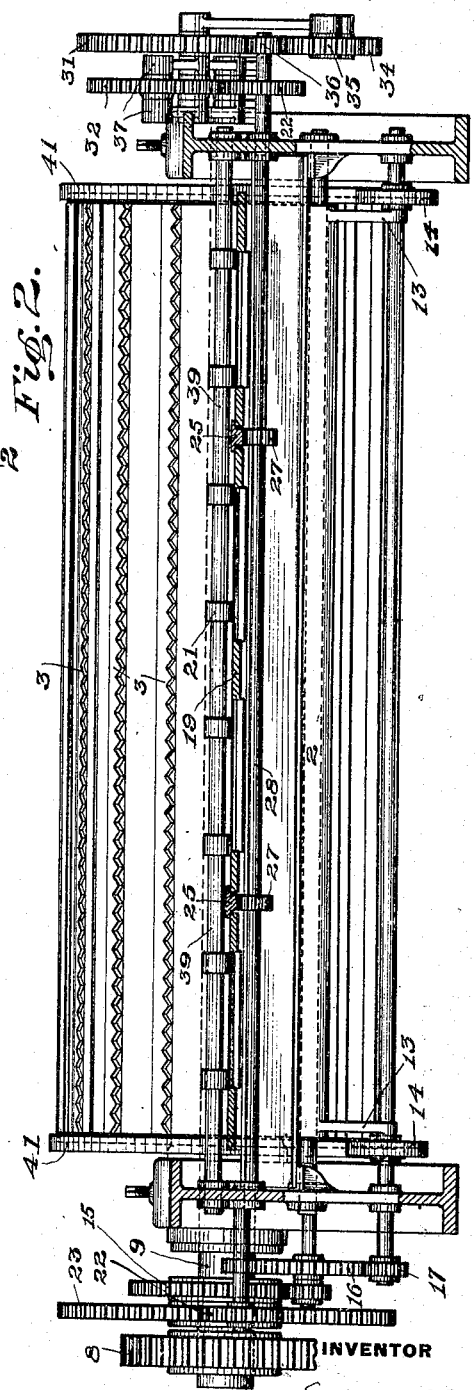
WITNESSES
INVENTOR

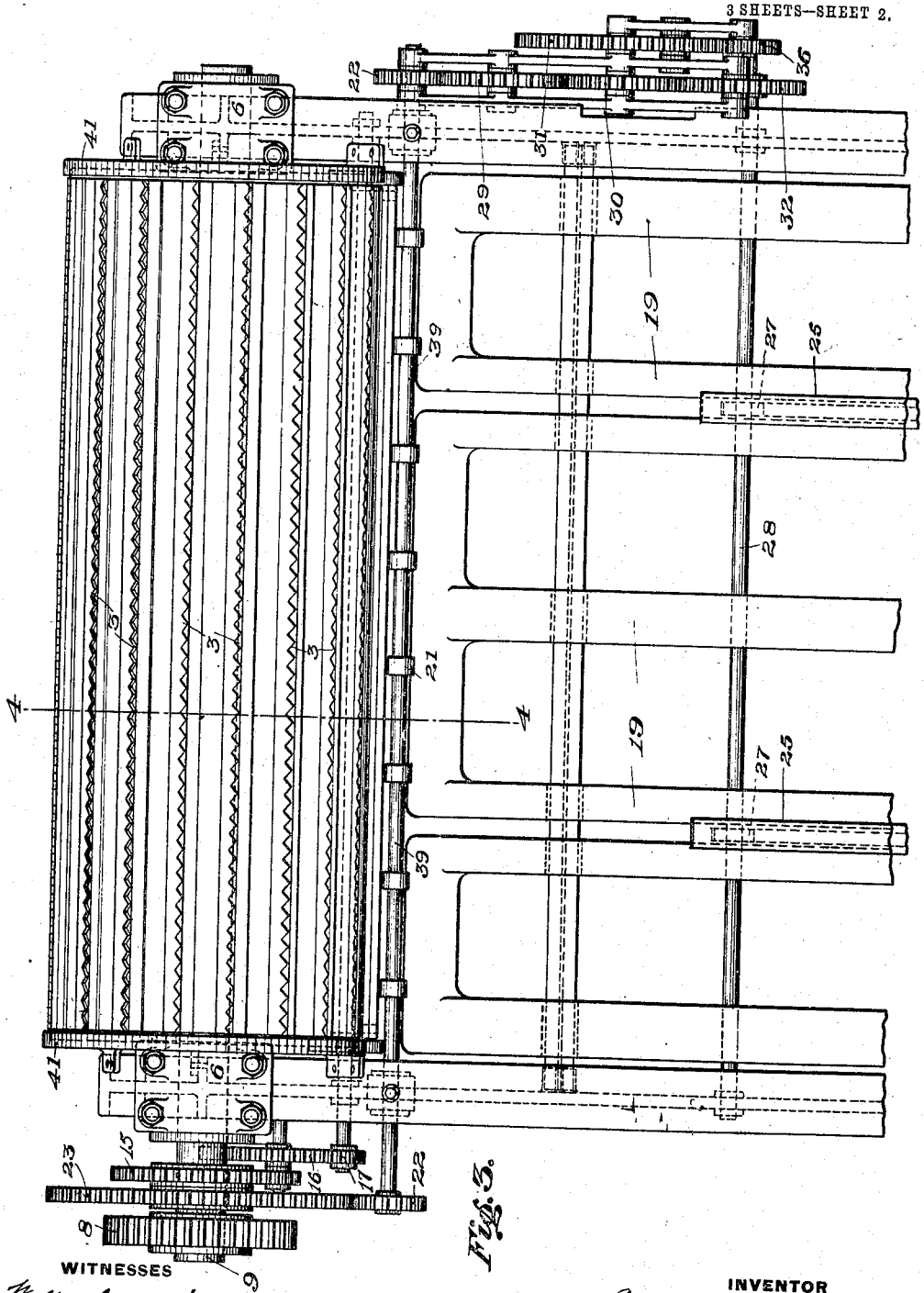

No. 858,636. PATENTED JULY 2, 1907.
L. C. STEELE.
MACHINE FOR MAKING EXPANDED METAL
APPLICATION FILED AUG. 20, 1906.
3 SHEETS—SHEET 3.
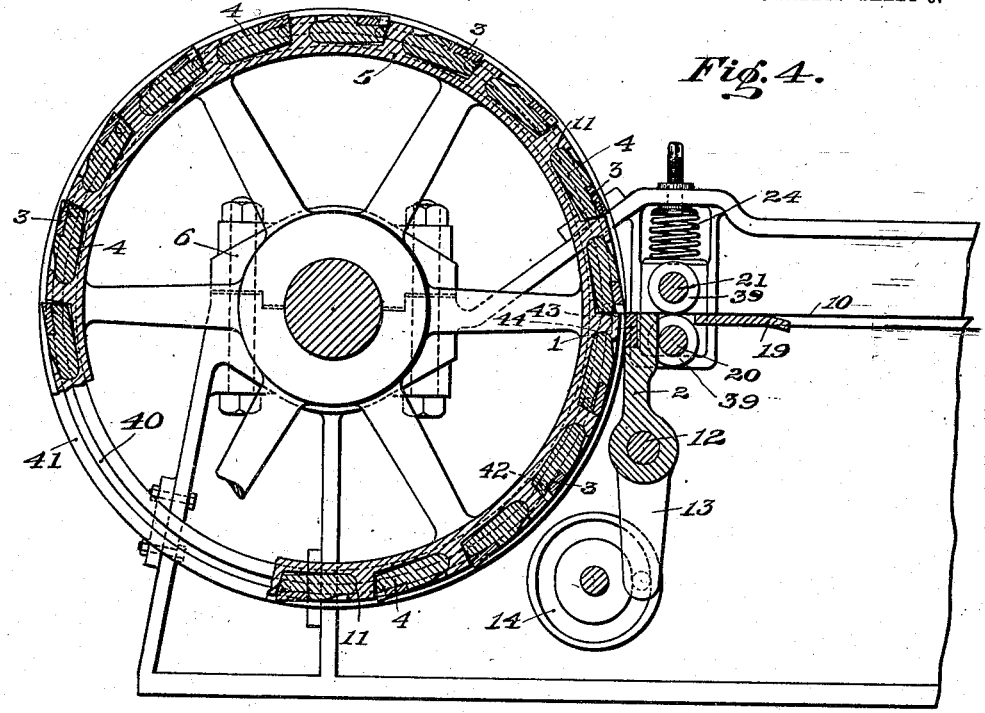
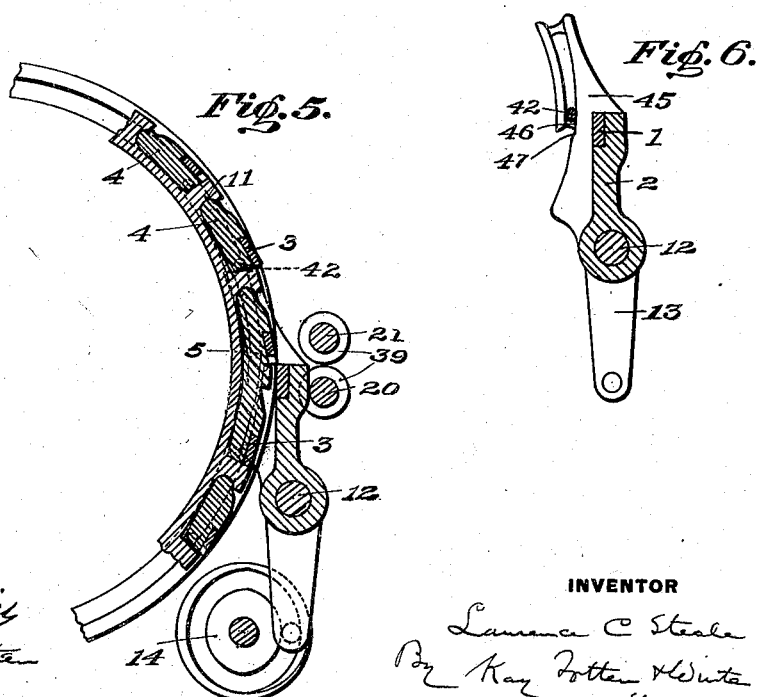
WITNESSES
INVENTOR
Laurence C Steele

UNITED STATES PATENT OFFICE.

LAWRENCE C. STEELE, OF PITTSBURG, PENNSYLVANIA.

MACHINE FOR MAKING EXPANDED METAL.

No. 858,630.  Specification of Letters Patent.  Patented July 2, 1907.

Application filed August 20, 1906. Serial No. 331,312.

*To all whom it may concern:*

Be it known that I, LAWRENCE C. STEELE, a resident of Pittsburg, in the county of Allegheny and State of Pennsylvania, have invented a new and useful Improvement in Machines for Making Expanded Metal; and I do hereby declare the following to be a full, clear, and exact description thereof.

This invention relates to machines for making what is known as expanded metal, and the object of the invention is to provide a machine of this character whose operation is simple and more expeditious and whose output is much greater than machines heretofore used.

One type of machine for making expanded metal, viz., the Golding machine, consists of a stationery cutting blade and a co-operating reciprocating cutting blade acting to slit and expand or stretch the slitted portion of the metal. In the operation of machines of this character the plate is fed forward intermittently, and is also fed sidewise after each slitting and expanding step.

My invention comprises a machine acting on the same principle as the so-called reciprocating machines of the Golding type above described, but so constructed that the plate is fed forward continuously and requires no sidewise feeding, thus enabling the machine to be operated very rapidly and securing a large output.

The invention consists, generally stated, in a rotary cylinder or drum carrying one or more serrated blades, the serrations being arranged in alternative or staggered relation, and having co-operating with the same a relatively stationary blade and the necessary actuating mechanism whereby the rotation of the drum carries the blades thereon around to successively co-operate with the relatively stationary blade to slit and expand the metal, so that a number of slits in the metal may be made during each rotation of the drum or cylinder; and providing said machine with continuously acting mechanism for feeding the plate to the blades, both the stationary and movable blades being so mounted and arranged as to move with the travel of the plate while being fed.

In the accompanying drawings Figure 1 is a side elevation of a machine embodying my invention; Fig. 2 is a transverse vertical section on the line 2—2, Fig. 1; Fig. 3 is a plan view of the same; and Fig. 4 is a section on the line 4—4, Fig. 3; and Figs. 5 and 6 are sectional details showing a modification.

The essentials of my machine comprise a relatively stationary straight edged anvil blade 1 mounted on a bar or beam 2 and a number of serrated movable slitting and expanding blades 3 mounted upon bars 4 which in turn are mounted on the periphery of a cylinder or drum 5, the latter being mounted in suitable bearings 6 and rotated by any suitable mechanism, such as a gear 8 on the end of the shaft 9 of said cylinder or drum. The bars 4 carrying the blades 3 are arranged, as shown, parallel to the axis of the drum, and are so mounted that the edges of the blades 3 can move toward and from the axis of the drum, both for the purpose of clearing the work after completing the cutting and slitting operation, and also for the purpose of yielding or traveling with the feed of the plate 10 being slit. This movement of the blades may be secured in various ways. As shown in the drawings, the upper edges of the several bars are curved as shown at 11 and fit in correspondingly curved seats in the drum or cylinder, so that in effect said bars are pivoted at the centers of these curves, and can swing on said centers so as to move the blades toward and from the axis of the drum or cylinder. The relatively stationary blade 2 also is slightly movable so as to travel with the plate 10 as it is being fed forward. This movement also may be obtained in a variety of ways. As shown, the bar 2 carrying said blade is pivoted at 12 and is provided with an arm 13 bearing against a cam 14 which may be rotated from any suitable source of power, such as by connecting its shaft to the shaft 9 of the drum 5 by gears 15, 16 and 17.

The feeding mechanism comprises a suitable table 19 in front of the drum 5, said table having mounted adjacent to the drum a pair of rollers 20 and 21, the bottom one of which is shown as positively driven by a gear 22 on its shaft meshing with a gear 23 on the drum shaft 9, while the top roller 21 is pressed by adjustable springs 24 against the plate being fed forward. In addition to these rollers I make use of pushers 25 mounted in suitable guide-ways in the table and adapted to be moved in either direction by any suitable mechanism, that shown comprising racks 26 on the pushers and meshing with pinions 27 on a shaft 28 located under the table and extending transversely thereof. This shaft 28 is driven in either direction by the train of gearing shown in the drawings but which obviously may be replaced by any other well known gearing. This gearing comprises a gear 29 meshing with the driven gear 22 on the roller 20, said gear 29 in turn meshing with a gear 30 fixed to a common shaft with a larger gear 31. The gear 30 meshes with another gear 32 which in turn meshes with a gear 33 on the shaft 28, while the larger gear 31 is connected by the intermediate gears 34 and 35 to a pinion or smaller gear 36 on the shaft 28. The gears 29, 30, 31, 32, 34 and 35 are mounted in a suitably movable frame, such as shown at 37 and the arrangement of the gears is such that only one of the gears 32 or 35 can be in mesh at a time with its companion gear on the shaft 28. This frame can be moved in any suitable way so as to bring either of said trains of gears into action. When the plate is being fed forward the shaft 28 is driven from the gear 22 and through the gears 29, 30, 32 and 33, thus giving a slow forward feed to the plate 10. When this plate has been entirely cut and expanded it is necessary to withdraw the pushers 25 in order to insert a new plate, and when this is done by moving the frame 37 the reverse feed is gotten from gear 22 through gears 29, 30, 31, 34, 35 and 36, thus giving a quick return to the pushers. The rollers 20 and 21 are cut away, as shown at 39, so as to allow the pushers 25 to pass through the same and approach closely to the blades. This prevents scrap at the end of the plate.

It will be observed that the feed of the plate is continuous and consequently the cutting blades must travel with the plate while cutting and expanding the same. This is accomplished by the cam 14 which serves to move the relatively stationary blade 1 slightly in the line of feed of the plate while cutting, and inasmuch as the blades on the cylinder or drum are embedded in the metal during this operation they are also moved along with the forward feed of the plate. I prefer, however, to provide additional positive means in the form of a cam for moving the cylinder blades with the forward travel of the plate. This additional means may take the form of a cam groove 40 formed in stationary rings 41 at each end of the drum or cylinder 5, which groove or grooves are adapted to receive trunnions or pins 42 on the lower portions of the ends of the bars 4. The cam groove 40 is concentric with the axis of the drum for the major portion of its course but opposite the slitting point is provided with a portion 43 which has a slight inward trend, sufficient to cause the blade to move inwardly with the feed of the plate 10 while being cut, said groove then having another portion 44 which has a relatively sharp trend so that when the slitting and expansion is completed, the blade on the drum is moved sharply inwardly so as to clear the expanded sheet.

In lieu of this cam groove 40 I may, as shown in Figs. 5 and 6, provide the stationary blade bar 2 with a projecting portion 45 arranged to engage directly with the bars 4, or, vice versa, provide the bars 4 with projecting portions arranged to engage the bar 2, said projecting portion in either case having a face 46 which will be in engagement with the trunnion or pin 42 of the bar 4 during the slitting and expanding movement and will cause the bar 4 to move inwardly with the bar 2 and corresponding to the forward feed of the plate 10, said projection then having a cam portion 47 which will cause the bar 4 to be moved abruptly inwardly to clear the work.

The operation of my machine will be readily understood from the foregoing description. The plate on the table 19 is fed continuously by the mechanism described. It has no sidewise feed because the serrations of the several blades 3 are arranged alternately as shown in Fig. 2. The rotation of the cylinder 4 carries the several knife carrying bars 4 around to co-operate in succession with the relatively stationary knife 1, so that for each rotation of the cylinder or drum a considerable number of slitting and expanding operations on the plate are effected. Both sets of knives while acting on the metal move along with the plate, so that the feed of the latter can be continuous and uninterrupted. The cam formation described acts to move the knives or blades on the cylinders sharply inwardly as soon as the expansion is complete, thus clearing the work.

The output of the machine described is very materially greater than that of reciprocating machines having the same action on the metal. Furthermore, the feed is continuous and uninterrupted and consequently is more uniform than that of an intermittent feed.

The mechanical details of many parts of the machine can be varied without departing from the spirit of my invention. For instance, various forms of feeding mechanism will readily suggest themselves to those skilled in the art. Furthermore, various mechanical devices may be employed for getting the necessary movements of the two sets of blades forwardly with the plate while being cut, and also to get the necessary movement of the cylinder blades in order to clear the work.

What I claim is:

1. In a metal expanding machine, the combination of a cylinder or drum mounted to rotate constantly in the same direction, a serrated slitting and expanding knife carried by the cylinder and arranged with its edge substantially parallel to the axis thereof, and a co-operating anvil knife arranged parallel to said cylinder.

2. In a metal expanding machine, the combination of a cylinder or drum mounted to rotate constantly in the same direction, a slitting and expanding knife carried by the cylinder and arranged with its edge substantially parallel to the axis thereof, a co-operating anvil knife arranged parallel to the cylinder, and means for effecting disengagement between the movable knife and the work at the end of the cutting and expanding operations.

3. In a metal expanding machine, the combination of a rotating cylinder or drum, a plurality of serrated slitting and expanding knives carried by the cylinder and arranged substantially parallel to the axis of the cylinder and with the serrations of successive knives in alternation, and a co-operating slitting and expanding knife arranged parallel to the axis of the cylinder.

4. In a metal expanding machine, the combination of a rotating cylinder or drum, a plurality of serrated slitting and expanding knives carried by the cylinder and arranged substantially parallel to the axis thereof and with the serrations of succeeding knives in alternation, a co-operating slitting and cutting knife arranged parallel to the axis of the cylinder, and means for effecting disengagement between the movable knives and the work at the end of the respective cutting and expanding operations.

5. In a metal expanding machine, the combination of a rotating cylinder or drum, a bar mounted thereon and arranged longitudinally thereof and carrying a slitting and expanding knife, said bar being movable toward and from the axis of the cylinder, a co-operating slitting and expanding knife arranged parallel to the cylinder, and means for moving the knife bar of the cylinder toward the cylinder axis at the end of the cutting and expanding operation.

6. In a metal expanding machine, the combination of a rotating cylinder or drum, a bar extending longitudinally thereof and mounted thereon so as to be movable toward and from its axis, a slitting and expanding knife carried by said bar, a co-operating knife arranged parallel to the cylinder, and a cam arranged to move the knife bar of the cylinder toward the axis thereof at the end of the slitting and expanding operation.

7. In a metal expanding machine, the combination of a rotating cylinder or drum, a plurality of bars extending longitudinally thereof and mounted to move toward and from the axis thereof, each bar carrying a knife, a co-operating knife arranged parallel to the drum, and means for moving the knife bars of the cylinder toward the axis thereof at the end of the slitting and expanding opration of each knife.

8. In a metal expanding machine, the combination of a rotating cylinder or drum, a plurality of bars extending longitudinally thereof and mounted thereon so as to be movable toward and from its axis, a knife carried by each bar, a co-operating knife arranged parallel to the cylinder, and a cam arranged to move each knife bar on the cylinder toward the axis of said cylinder at the end of the cutting and expanding operation.

9. In a metal expanding machine, the combination of a rotating cylinder or drum, a bar extending longitudinally of the drum and pivotally connected thereto so as to move toward and from the axis of the cylinder, a knife carried by the bar, a co-operating knife arranged parallel to the cylinder, and means for moving the cylinder knife bar toward axis of the cylinder.

10. In a metal expanding machine, the combination of co-operating slitting and expanding knives, continuous feeding mechanism, means permitting the knives while cutting to move forwardly with the feed of the plate, and means for effecting a disengagement of the knives from the work at the end of the cutting and expanding operation.

11. In a metal expanding machine, the combination of a movable serrated slitting and expanding knife, a co-operating anvil knife, continuous feeding mechanism for the plate, and means for moving said knives while cutting with the forward feed of the blade.

12. In a metal expanding machine, the combination of a movable serrated slitting and expanding knife, a co-operating anvil knife, continuous feeding mechanism for the plate, said knives being arranged to move while cutting with the forward feed of the plate, and means for effecting disengagement between the movable knife and plate at the end of the cutting and expanding operation.

13. In a metal expanding machine, the combination of a rotating cylinder or drum, a slitting and expanding knife arranged longitudinally thereon, a co-operating anvil knife arranged parallel to the cylinder, continuous plate feeding mechanism, means for moving the knives while cutting with the plate, and means for effecting a disengagement of the cylinder knife and the work at the end of the cutting and expanding operation.

14. In a metal expanding machine, the combination of a rotating cylinder or drum, a slitting and expanding knife arranged longitudinally thereon and mounted to move toward and from the axis of the cylinder, a co-operating knife arranged parallel to the cylinder, continuous plate feeding mechanism, and means for moving said knives while cutting with the feed of the plate.

15. In a metal expanding machine, the combination of a rotating cylinder or drum, a slitting and expanding knife mounted thereon and arranged longitudinally and movable toward and from the axis of the drum, a co-operating knife arranged parallel to the drum, continuous plate feeding mechanism, and a cam for moving said knives toward the axis of the drum while cutting.

16. In a metal expanding machine, the combination of a rotating cylinder or drum, a plurality of bars mounted longitudinally thereon so as to move toward and from the axis of said drum, knives carried by each bar, a co-operating knife arranged parallel to the drum, continuously acting feeding mechanism arranged to feed the plate toward the axis of the drum, means for moving the co-operating knife while cutting with the feed of the plate, and means for then moving the cylinder knives further toward the axis of the drum to clear the work.

In testimony whereof, I the said LAWRENCE C. STEELE have hereunto set my hand.

LAWRENCE C. STEELE.

Witnesses:
M. D. VOGEL,
F. W. WINTER.